US009609473B2

(12) United States Patent
Zhang

(10) Patent No.: US 9,609,473 B2
(45) Date of Patent: Mar. 28, 2017

(54) SERVICE PROCESSING METHOD AND APPARATUS BASED ON LOCATION INFORMATION

(71) Applicant: Baidu Online Network Technology (Beijing) Co., Ltd, Beijing (CN)

(72) Inventor: Baolong Zhang, Beijing (CN)

(73) Assignee: Baidu Online Network Technology (Beijing) Co., Ltd., Beijing (CN)

( * ) Notice: Subject to any disclaimer, the term of this patent is extended or adjusted under 35 U.S.C. 154(b) by 0 days.

(21) Appl. No.: 14/587,783

(22) Filed: Dec. 31, 2014

(65) Prior Publication Data
US 2016/0066135 A1 Mar. 3, 2016

(30) Foreign Application Priority Data

Sep. 2, 2014 (CN) .......................... 2014 1 0443360

(51) Int. Cl.
*H04W 24/00* (2009.01)
*H04W 4/02* (2009.01)
*G06Q 10/08* (2012.01)

(52) U.S. Cl.
CPC .......... *H04W 4/02* (2013.01); *G06Q 10/0833* (2013.01); *H04W 4/021* (2013.01); *H04W 4/028* (2013.01)

(58) Field of Classification Search
CPC ....... H04W 4/02; H04W 4/021; H04W 4/028; G06Q 10/0833
USPC ......................... 455/456.1, 456.5, 456.3, 457
See application file for complete search history.

(56) References Cited

U.S. PATENT DOCUMENTS

| 6,735,332 | B1 * | 5/2004 | Goldberg | ................ G06T 7/004 382/141 |
| 9,491,577 | B1 * | 11/2016 | Jones | .................... H04W 4/021 |
| 2006/0200305 | A1 * | 9/2006 | Sheha | .................... G01C 21/20 701/420 |

(Continued)

FOREIGN PATENT DOCUMENTS

| GB | WO 2009109736 A2 * | 9/2009 | ......... G08B 21/0202 |
| WO | WO 2009/109736 A2 | 9/2009 | |

OTHER PUBLICATIONS

Extended European Search Report, EP Application No. 14200736.8, Nov. 26, 2015.

*Primary Examiner* — Khai M Nguyen
(74) *Attorney, Agent, or Firm* — Orrick, Herrington & Sutcliffe LLP

(57) ABSTRACT

The embodiments of the present invention disclose a service processing method and apparatus based on location information. The method comprises: acquiring, by an application server, a positioning signal sent by a positioning terminal; determining, by the application server, location information about the positioning terminal according to the positioning signal; and sending, by the application server, service processing information to an application client and/or a positioning terminal according to a service processing rule and based on the location information about the positioning terminal. The present invention achieves the technical effect of the application server sending adaptive service processing information to the application client and/or the positioning terminal according to different service processing rules, optimizes the existing location-based service technology, and meets the growing demand of people for individual and customized location-based services.

20 Claims, 6 Drawing Sheets

(56) References Cited

U.S. PATENT DOCUMENTS

| | | | |
|---|---|---|---|
| 2007/0264969 A1* | 11/2007 | Frank | G06Q 10/1095 455/404.2 |
| 2007/0264974 A1* | 11/2007 | Frank | H04L 63/0407 455/411 |
| 2008/0088437 A1* | 4/2008 | Aninye | G07C 9/00111 340/539.13 |
| 2008/0133730 A1* | 6/2008 | Park | G01C 21/28 709/223 |
| 2009/0040041 A1* | 2/2009 | Janetis | G01S 5/0027 340/539.13 |
| 2012/0142343 A1* | 6/2012 | Wohld | H04W 72/02 455/432.1 |
| 2013/0103606 A1 | 4/2013 | Holliday | |
| 2014/0024333 A1* | 1/2014 | Stadtlander | H04W 4/22 455/404.2 |
| 2014/0206389 A1* | 7/2014 | Aldana | H04W 4/021 455/456.2 |

* cited by examiner

SERVICE PROCESSING METHOD AND APPARATUS BASED ON LOCATION INFORMATION

CROSS-REFERENCE TO RELATED APPLICATIONS

The present application claims priority to Chinese Patent Application No. CN201410443360.9, filed on Sep. 2, 2014, the entire disclosure of which is incorporated herein by reference in its entirety and for all purposes.

TECHNICAL FIELD

The embodiments of the present invention relate to positioning technology, and in particular, to a service processing method and apparatus based on location information.

BACKGROUND

With the continuous development of communication technology and terminal technology, more and more service providers provide services to users based on LBS (Location-Based Service) technology. LBS is a value-added service provided by a mobile communication network combined with a global positioning system.

At present, service providers in various industries provide a relevant service to a user mainly according to a current location of the user. For example, an audio guide device of a major museum provides a corresponding tour guide service to a tourist by perceiving the location of handset use, the mobile terminal-based Baidu Map provides a navigation service to a driver by perceiving a location change in a mobile terminal, etc.

However, with the development of technology, the demand of people on location-based service is higher and higher, and traditional location-based services cannot meet the growing demand of people for individual and customized location-based services.

SUMMARY

Provided in the present invention are a service processing method and apparatus based on location information, so as to optimize existing location based service technology and meet the growing demand of people for individual and customized location-based services.

In a first aspect, a service processing method based on location information is provided in the embodiments of the present invention. The service processing method based on location information comprises:

acquiring, by an application server, a positioning signal sent by a positioning terminal;

determining, by the application server, location information about the positioning terminal according to the positioning signal; and sending, by the application server, service processing information to an application client and/or a positioning terminal according to a service processing rule and based on the location information about the positioning terminal.

In a second aspect, a service processing method based on location information is also provided in the embodiments of the present invention. The service processing method based on location information comprises:

collecting, by a positioning terminal, a positioning signal of a current location; and sending, by the positioning terminal, the positioning signal to an application server, so that the application server determines location information about the positioning terminal according to the positioning signal, and exchanges service processing information with an application client according to a service processing rule and based on the location information about the positioning terminal.

In a third aspect, a service processing method based on location information is also provided in the embodiments of the present invention. The service processing method based on location information comprises:

sending, by an application client, a terminal monitoring request to an application server to control a positioning terminal; and/or acquiring, by the application client, service processing information which is determined according to a service processing rule and based on location information about the positioning terminal from the application server.

In a fourth aspect, a service processing apparatus based on location information is also provided in the embodiments of the present invention, which is configured in an application server, and the service processing apparatus based on location information comprises:

a positioning signal acquisition unit for acquiring a positioning signal sent by a positioning terminal;

a location information determination unit for determining location information about the positioning terminal according to the positioning signal; and a service processing information sending unit for sending service processing information to an application client and/or a positioning terminal according to a service processing rule and based on the location information about the positioning terminal.

In a fifth aspect, a service processing apparatus based on location information is also provided in the embodiments of the present invention, which is configured in a positioning terminal, and the service processing apparatus based on location information comprises:

a positioning signal collection unit for collecting a positioning signal of a current location; and a positioning signal sending unit for sending the positioning signal to an application server, so that the application server determines location information about the positioning terminal according to the positioning signal, and exchanges service processing information with an application client according to a service processing rule and based on the location information about the positioning terminal.

In a sixth aspect, a service processing apparatus based on location information is also provided in the embodiments of the present invention, which is configured in an application client, and the service processing apparatus based on location information comprises:

a monitoring request sending unit for sending a terminal monitoring request to an application server to control a positioning terminal; and/or a service processing information acquisition unit for acquiring, from the application server, service processing information which is determined according to a service processing rule and based on location information about the positioning terminal.

By means of the technical means of acquiring, by an application server, a positioning signal sent by a positioning terminal; determining, by the application server, location information about the positioning terminal according to the positioning signal; and sending, by the application server, service processing information to an application client and/or or a positioning terminal according to a service processing rule and based on the location information about the positioning terminal, the embodiments of the present invention solve the technical problem that traditional location-based services cannot meet the growing demand of people for individual and customized location-based services, achieve the technical effect of the application server sending adaptive service processing information to the application client and/or the positioning terminal according to different service processing rules, optimize existing location-based service technology, and meet the growing demand of people for individual and customized location-based services.

BRIEF DESCRIPTION OF THE ACCOMPANYING DRAWINGS

DETAILED DESCRIPTION OF THE PREFERRED EMBODIMENTS

The present invention will be further described in detail below in conjunction with the accompanying drawings and the embodiments. It can be understood that specific embodiments described herein are merely used for explaining the present invention, rather than limiting the present invention. Additionally, it also needs to be noted that, for ease of description, the accompanying drawings only show parts related to the present invention rather than all the structures.

A positioning terminal, an application server and an application client shall be used cooperatively to implement various embodiments of the present invention. The positioning terminal may specifically comprise various terminal devices having a positioning signal processing function, for example, a smart phone, a tablet computer, an electronic chip having a positioning information processing function, and a wearable device integrated with the above-mentioned electronic chip; the application server may specifically be a server providing a service processing service based on location information, which implements a positioning function mainly based on a positioning signal reported by the positioning terminal, and implements specific service processing functions based on the location information acquired by positioning; and the application client may specifically be a terminal device controlling the positioning terminal or acquiring service processing information, for example, a smart phone, a tablet computer, or a desktop. The application client and the positioning terminal may be respectively independent physical devices, such that the device where the application client is located need not have a positioning signal processing function, and can control service processing processes of other positioning terminals located elsewhere, thereby enriching the forms of service processing implemented based on location information.

The first to fifth embodiments of the present invention will be described in detail centered on the application server; the sixth and seventh embodiments of the present invention will be described in detail centered on the positioning terminal; and the eighth embodiment of the present invention will be described in detail centered on the application client.

The First Embodiment

Figure 1:
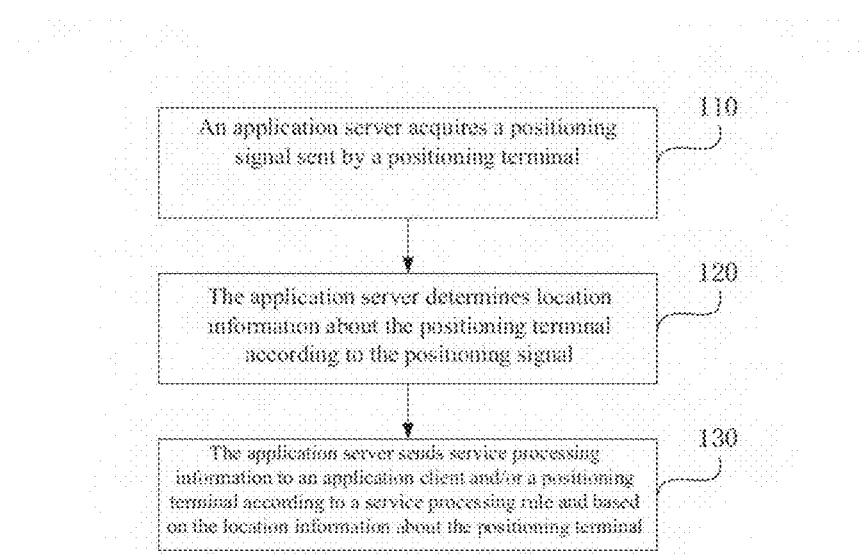
FIG. 1 is a flowchart of a service processing method based on location information according to a first embodiment of the present invention.

FIG. 1 is a flowchart of a service processing method based on location information provided in the first embodiment of the present invention. The method of this embodiment may be executed by a service processing apparatus based on location information. This apparatus may be implemented by hardware and/or software, and may be generally integrated in an application server capable of providing a service processing service based on location information and be used cooperatively with a positioning terminal and an application client. The application server may be a server of a service provider or a third-party server, and may be one server or a cluster of a plurality of servers, but is not limited to this. The method of this embodiment specifically comprises the operations as follows:

110. An application server acquires a positioning signal sent by a positioning terminal.

In this embodiment, the positioning signal sent by the positioning terminal and acquired by the application server may be any positioning signal capable of determining the location of the positioning terminal, such as a GPS (Global Positioning System) signal, a base station wireless signal, a WIFI (Wireless-Fidelity) signal, and any combination of the above-mentioned three signals.

In this embodiment, the positioning signal sent by the positioning terminal and acquired by the application server may also comprise supplemental positioning signals associated with a direct positioning signal, such as the system time when the positioning terminal acquires the direct positioning signal, or a terminal identification of the positioning terminal sending the direct positioning signal, but is not limited to this.

The application server preferably acquires the positioning signal sent by the positioning terminal wirelessly, and may transmit this positioning signal based on any appropriate protocol, for example, the positioning signal is transmitted through TCP/HTTP protocol.

120. The application server determines location information about the positioning terminal according to the positioning signal.

The location information about the positioning terminal may have various specific contents and forms implemented individually or in combination, which will be specifically described as follows:

firstly, in this embodiment, the location information about the positioning terminal determined by the application server according to the positioning signal may be a location point of the positioning terminal.

The application server may determine the latitude and longitude information about the location of the positioning terminal as the location point of the positioning terminal.

Specifically, the application server may determine the location point of the positioning terminal merely according to one type of positioning signal, for example, a GPS signal, a base station wireless signal or a WIFI signal; and the positioning terminal may also determine the location point of the positioning terminal according to at least two types of positioning signals, for example: when a GPS signal can be received, the location point of the positioning terminal is determined according to the GPS signal, and when the GPS signal cannot be received, the location point of the positioning terminal is determined using a WIFI signal around the last location point determined according to the GPS signal. Of course, the application server may also determine the location point of the positioning terminal in other ways, and is not limited to this.

Secondly, in this embodiment, the location information about the positioning terminal determined by the application server according to the positioning signal may be a location track of the positioning terminal.

The application server may use a result of connecting at least two location points corresponding to the same positioning terminal according to the time sequence as the location track of the positioning terminal.

Specifically, the application server may determine the location track of the positioning terminal according to the positioning signals acquired at at least two moments.

Thirdly, in this embodiment, the location information about the positioning terminal determined by the application server according to the positioning signal may also be the geofencing of the positioning terminal.

Specifically, the application server acquires a location relationship between the location and the geofencing of the positioning terminal by means of comparison according to an acquired location signal of the positioning terminal and preset geofencing information. Specifically, it may be determining whether the positioning terminal is located inside the preset geofencing, or monitoring whether the positioning terminal approaches or exceeds a preset geofencing boundary.

Fourthly, in this embodiment, the location information about the positioning terminal determined by the application server according to the positioning signal may be the location point of the positioning terminal, the system time, etc.

Of course, the location information may also be richer, for example, the location track and its system time.

130. The application server sends service processing information to an application client and/or a positioning terminal according to a service processing rule and based on the location information about the positioning terminal.

In this embodiment, the service processing rule may specifically be a processing rule made according to service attributes or service requirements (for example, positioning requirements or location-based service processing requirements); and may specifically relate to the rule of a client and/or a positioning terminal sending information to the application server, and a processing rule selected by the application server according to the information sent by the client and/or the positioning terminal. The service processing rule may be preset in the application server, or may be set by the application client sending requests in real time.

Accordingly, the service processing information may specifically be a data processing result which is generated by the application server according to the location information about the positioning terminal and conforms to the set service attributes or meets the specific service requirements.

For example, regarding the service requirement of an application client positioning a positioning terminal through an application server, the above-mentioned service processing rule may specifically be: the application server returns, according to a positioning search request sent by the application client, the location information about the positioning terminal determined by the positioning search request to the application client as the service processing information; and in another example, regarding the service requirement of an application client setting up geofencing for a positioning terminal through an application server, the above-mentioned service processing rule may specifically be: the application server sends a geofencing reminder notification to a target positioning terminal according to a geofencing set-up request sent by the application client and according to the location information about the target positioning terminal determined by the geofencing set-up request.

Of course, those of skill in the art may set the service processing rule according to practical requirements, which is not limited by this embodiment.

By means of the technical means of acquiring, by an application server, a positioning signal sent by a positioning terminal; determining, by the application server, location information about the positioning terminal according to the positioning signal; and sending, by the application server, service processing information to an application client and/or a positioning terminal according to a service processing rule and based on the location information about the positioning terminal, the technical solution of this embodiment of the present invention achieves the technical effect of the application server sending adaptive service processing information to the application client and/or the positioning terminal according to different service processing rules, optimizes existing location-based service technology, and meets the growing demand of people for individual and customized location-based services. Since the application client and the positioning terminal may be independently configured physically, and each has functions such as service control and positioning signal uploading, richer and more novel service processing modes based on location information are provided.

On the basis of the above-mentioned embodiment, the method may also comprise:

acquiring, by the application server, a positioning mode (a GPS positioning mode or a base station positioning mode, etc.) preset locally or sent by the application client, and sending, by the application server, the positioning mode to the positioning terminal to control the type (a GPS signal or a base station wireless signal, etc.) of a positioning signal sent by the positioning terminal; or acquiring, by the application server, a positioning frequency preset locally or sent by the application client (positioning every 5 seconds or 10 seconds, etc.), and sending, by the application server, the positioning mode to the positioning terminal to control the positioning frequency of the positioning terminal (positioning every 5 seconds or 10 seconds, etc.); or acquiring, by the application server, a positioning mode and a positioning frequency preset locally or sent by the application client, and sending, by the application server, the positioning mode and the positioning frequency to the positioning terminal to control the type and the positioning frequency of a positioning signal sent by the positioning terminal.

The advantage of this set-up is: the application server may control the type and the positioning frequency of the positioning signal sent by the positioning terminal according to practical requirements, rather than merely acquire the positioning signal sent by the positioning terminal simply and passively, thereby improving the flexibility, generality and applicability of the application server acquiring the positioning signal.

The Second Embodiment

Figure 2:
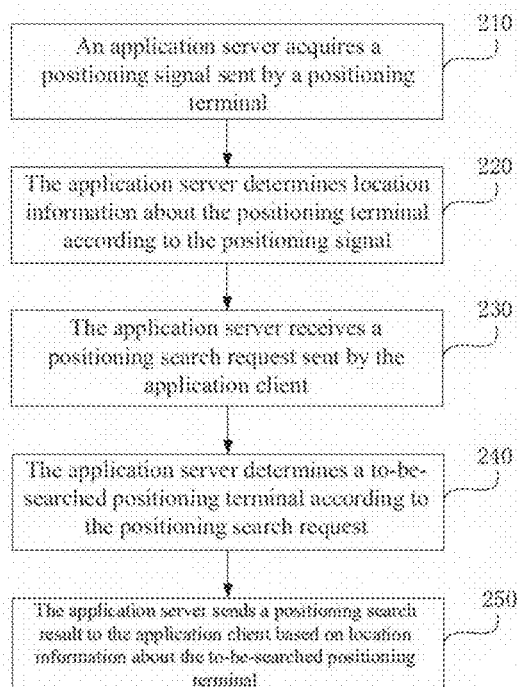
FIG. 2 is a flowchart of a service processing method based on location information according to a second embodiment of the present invention.

FIG. 2 is a flowchart of a service processing method based on location information according to the second embodiment of the present invention. The operation of the application server sending service processing information to the application client according to a service processing rule and based on the location information about the positioning terminal may be applied to a variety of scenarios, and a variety of implementations are provided. This embodiment is optimized based on the above-mentioned embodiment to provide a preferred implementation: the application server receiving a positioning search request sent by the application client; the application server determining a positioning terminal to be sought according to the positioning search request; and the application server sending a positioning search result to the application client based on location information about the positioning terminal to be sought.

Accordingly, the method of this embodiment comprises the operations as follows:

210. An application server acquires a positioning signal sent by a positioning terminal.

220. The application server determines location information about the positioning terminal according to the positioning signal.

230. The application server receives a positioning search request sent by the application client.

In this embodiment, the positioning search request sent by the application client and acquired by the application server is specifically a request that the application client performs a location search (a location point or a location track, etc.) on at least one specified positioning terminal or a positioning terminal meeting a set search condition.

The application server may receive the positioning search request sent by the application client by setting a search service providing interface (for example, a search engine entrance or an input interface with the application program being set, etc.).

240. The application server determines a positioning terminal to be sought according to the positioning search request.

In this embodiment, the application server may determine the positioning terminal to be sought according to terminal identification information comprised in the positioning search request.

250. The application server sends a positioning search result to the application client based on location information about the positioning terminal to be sought.

In this embodiment, the application server stores the location information corresponding to the terminal identification of the positioning terminal. The application server may store location information about the current moment of the positioning terminal, may also store historical location information about the positioning terminal, and may also store the location information about the current moment and the historical location information about the positioning terminal at the same time, but is not limited to this.

In this embodiment, the application server generates a corresponding positioning search result according to the request type of the received positioning search request and the location information about the positioning terminal to be sought, and sends same to the application client.

For example, the positioning search request sent by the application client comprises a location track search request for two positioning terminals to be sought with the terminal identifications "ABC" and "DFE" in a time interval of "2014.8.29-2014.8.31", and the application server searches for location tracks of positioning terminals stored therein and respectively corresponding to the terminal identifications "ABC" and "DEF" in the above-mentioned time interval as a positioning search result, and sends same to a corresponding application client.

By means of the technical means of acquiring, by an application server, a positioning signal sent by a positioning terminal; determining, by the application server, location information about the positioning terminal according to the positioning signal; and sending, by the application server, service processing information to an application client and/or a positioning terminal according to a service processing rule and based on the location information about the positioning terminal, the technical solution of this embodiment of the present invention achieve the technical effect of the application server sending service adaptive processing information to the application client and/or the positioning terminal according to different service processing rules, optimize existing location-based service technology, and meet the growing demand of people for individual and customized location-based services.

The Third Embodiment

Figure 3:
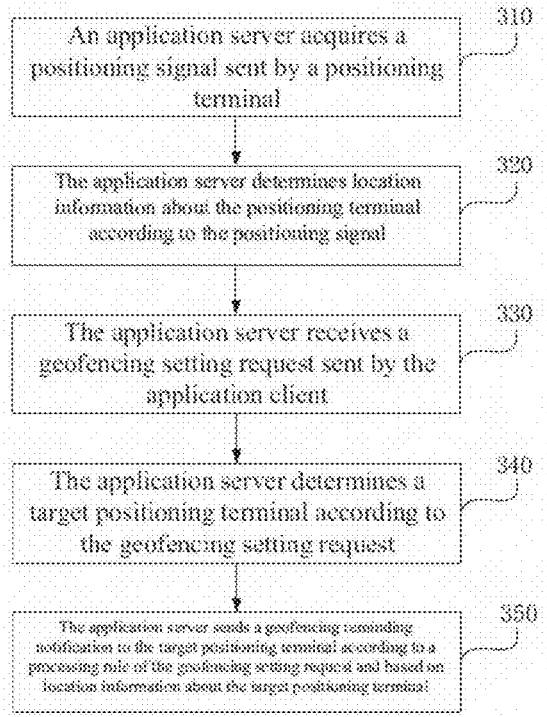
FIG. 3 is a flowchart of a service processing method based on location information according to a third embodiment of the present invention.

FIG. 3 is a flowchart of a service processing method based on location information according to the third embodiment of the present invention. This embodiment is optimized based on the above-mentioned embodiments to provide another preferred implementation for the operation of the application server sending service processing information to the positioning terminal according to a service processing rule and based on the location information about the positioning terminal, i.e. the application server receiving a geofencing set-up request sent by the application client; the application server determining a target positioning terminal according to the geofencing set-up request; and the application server sending a geofencing reminder notification to the target positioning terminal according to a service processing rule in the geofencing set-up request and based on location information about the target positioning terminal.

Accordingly, the method of this embodiment comprises the operations as follows:

310. An application server acquires a positioning signal sent by a positioning terminal.

320. The application server determines location information about the positioning terminal according to the positioning signal.

330. The application server receives a geofencing set-up request sent by the application client.

In this embodiment, the geofencing set-up request sent by the application client and acquired by the application server is specifically a request that the application client performs a geofencing set-up on at least one specified positioning terminal or a positioning terminal meeting a set search condition, a region or a determination condition of geofencing may be specifically set, and a strategy of performing reminder notification on the positioning terminal is set.

340. The application server determines a target positioning terminal according to the geofencing set-up request.

350. The application server sends a geofencing reminder notification to the target positioning terminal according to a service processing rule in the geofencing set-up request and based on location information about the target positioning terminal.

In this embodiment, the service processing rule in the geofencing set-up request may specifically be: determining whether to send the geofencing reminder notification to the target positioning terminal according to latitude and longitude information about a geofencing boundary value included in the geofencing set-up request and the location information about the target positioning terminal.

In a specific application scenario of this embodiment, the application client sets a geofencing boundary configured by four boundary points A, B, C and D for the positioning terminal with the terminal identification "123", and sends the geofencing set-up request to the application server. When judging that the positioning terminal "123" leaves the region ABCD according to a current location point of the positioning terminal "123", the application server sends a corresponding geofencing reminder notification to the positioning terminal "123".

By means of the technical means of acquiring, by an application server, a positioning signal sent by a positioning terminal; determining, by the application server, location information about the positioning terminal according to the positioning signal; and sending, by the application server, service processing information to an application client and/or a positioning terminal according to a service processing rule and based on the location information about the positioning terminal, the technical solution of this embodiment of the present invention achieves the technical effect of the application server sending adaptive service processing information to the application client and/or the positioning terminal according to different service processing rules, optimizes existing location-based service technology, and meets the growing demand of people for individual and customized location-based services.

The Fourth Embodiment

Figure 4:
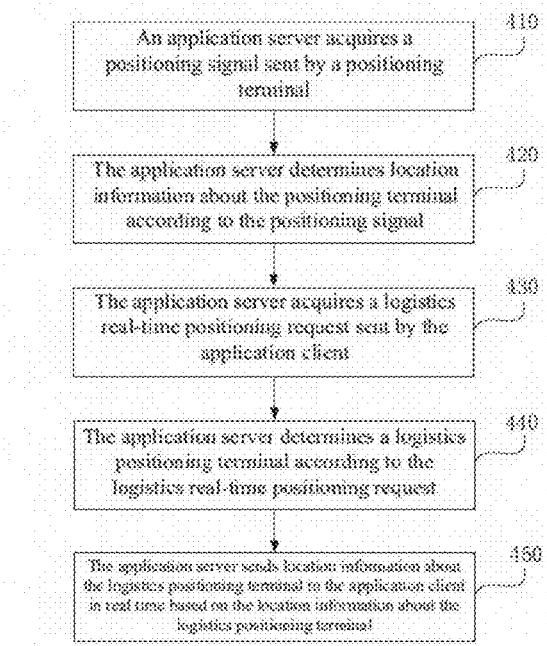
FIG. 4 is a flowchart of a service processing method based on location information according to a fourth embodiment of the present invention.

FIG. 4 is a flowchart of a service processing method based on location information according to the fourth embodiment of the present invention. This embodiment is optimized based on the above-mentioned embodiments to provide another preferred implementation for the operation of the application server sending service processing information to the positioning terminal according to a service processing rule and based on the location information about the positioning terminal, i.e. the application server acquiring a logistics real-time positioning request sent by the application client; the application server determining a logistics positioning terminal according to the logistics real-time positioning request; and the application server sending location information about the logistics positioning terminal to the application client in real time based on the location information about the logistics positioning terminal.

Accordingly, the method of this embodiment comprises the operations as follows:

410. An application server acquires a positioning signal sent by a positioning terminal.

420. The application server determines location information about the positioning terminal according to the positioning signal.

430. The application server acquires a logistics real-time positioning request sent by the application client.

In this embodiment, the logistics real-time positioning request sent by the application client and acquired by the application server is specifically a real-time positioning request performed by the application client on at least one specified logistics positioning terminal or a logistics positioning terminal meeting a set search condition.

The logistics positioning terminal may specifically be a positioning terminal configured for logistics articles or a positioning terminal configured for delivery staff delivering the logistics articles, etc., but is not limited to this.

440. The application server determines a logistics positioning terminal according to the logistics real-time positioning request.

450. The application server sends location information about the logistics positioning terminal to the application client in real time based on the location information about the logistics positioning terminal.

In a specific application scenario of this embodiment, an application client (for example, an application client configured in a logistics provider server or a third-party server, or an application client installed in an intelligent terminal of an online shopper), for acquiring real-time location information about an article purchased online, needs to acquire from the application server the location information about the positioning terminal configured for the delivery person of the article purchased online as the location information about the logistics positioning terminal. The online shopper may query the location of the positioning terminal of the delivery person by inputting an identification, such as the order number, to know the location of the article purchased online thereby. The logistics company may know delivery states of various delivery persons or delivery articles.

By means of the technical means of acquiring, by an application server, a positioning signal sent by a positioning terminal; determining, by the application server, location information about the positioning terminal according to the positioning signal; and sending, by the application server, service processing information to an application client and/or a positioning terminal according to a service processing rule and based on the location information about the positioning terminal, the technical solution of this embodiment of the present invention achieves the technical effect of the application server sending adaptive service processing information to the application client and/or the positioning terminal according to different service processing rules, optimizes existing location-based service technology, and meets the growing demand of people for individual and customized location-based services.

The Fifth Embodiment

Figure 5:
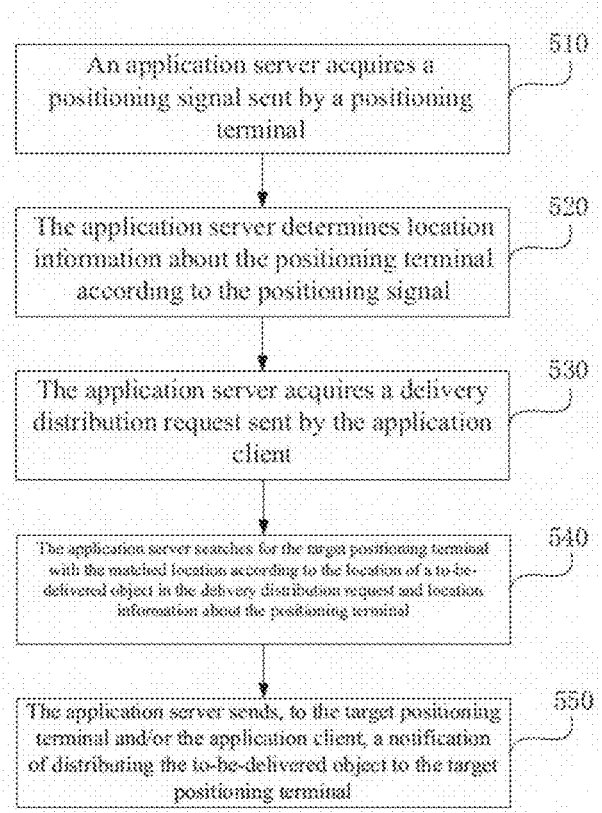
FIG. 5 is a flowchart of a service processing method based on location information according to a fifth embodiment of the present invention.

FIG. 5 is a flowchart of a service processing method based on location information according to the fifth embodiment of the present invention. This embodiment is optimized based on the above-mentioned embodiments to provide still another preferred implementation for the operation of sending, by the application server, service processing information to the application client and/or the positioning terminal according to a service processing rule and based on the location information about the positioning terminal, i.e. acquiring, by the application server, a delivery distribution request sent by the application client; searching for, by the application server, a target positioning terminal with a matching location according to the location of an object to be delivered in the delivery distribution request and location information about at least one positioning terminal; and sending, by the application server, a notification of distributing the object to be delivered to the target positioning terminal to the target positioning terminal and/or the application client.

Accordingly, the method of this embodiment comprises the operations as follows:

510. An application server acquires a positioning signal sent by a positioning terminal.

520. The application server determines location information about the positioning terminal according to the positioning signal.

530. The application server acquires a delivery distribution request sent by the application client.

In this embodiment, the delivery distribution request sent by the application client and acquired by the application server is specifically a request sent by the application client to distribute at least one object to be delivered to at least two delivery persons.

The delivery distribution request may also comprise information, such as the delivery place and delivery time, corresponding to the object to be delivered, but is not limited to this.

540. The application server searches for a target positioning terminal with a matching location according to the location of the object to be delivered in the delivery distribution request and location information about at least one positioning terminal.

In this embodiment, the positioning terminal specifically refers to a positioning terminal configured for the person or vehicle delivering the above-mentioned object to be delivered.

The application server searches for, by performing fusion processing on the location of the delivery place of the object to be delivered and the location information about the positioning terminal (for example, historical location tracks or the current location point), a positioning terminal configured for the delivery person most suitable for delivering the object to be delivered (for example, a positioning terminal of which a historical location track passes the delivery place of the object to be delivered, or a positioning terminal of which a location point in the historical location track is nearest to the delivery place of the object to be delivered) as a target positioning terminal.

550. The application server sends, to the target positioning terminal and/or the application client, a notification of distributing the object to be delivered to the target positioning terminal.

In this embodiment, after finding the target positioning terminal, the application server may directly send to the target positioning terminal the notification of distributing the object to be delivered to the target positioning terminal, or directly send to the application client the notification of distributing the object to be delivered to the target positioning terminal, or send to the target positioning terminal and the application client the notification of distributing the object to be delivered to the target positioning terminal at the same time, but is not limited to this.

By means of the technical means of acquiring, by an application server, a positioning signal sent by a positioning terminal; determining, by the application server, location information about the positioning terminal according to the positioning signal; and sending, by the application server, service processing information to an application client and/or a positioning terminal according to a service processing rule and based on the location information about the positioning terminal, the technical solution of this embodiment of the present invention achieves the technical effect of the application server sending adaptive service processing information to the application client and/or the positioning terminal according to different service processing rules, optimizes existing location-based service technology, and meets the growing demand of people for individual and customized location-based services.

In the above-mentioned various preferred implementations, for the operation of the application server determining the location information about the positioning terminal based on the positioning signal and the operation of the application client requesting the service processing, the execution order thereof is not specifically limited, so the location information may be determined in real time, or the location information may be determined before or after the service processing request is acquired.

The Sixth Embodiment

Figure 6:
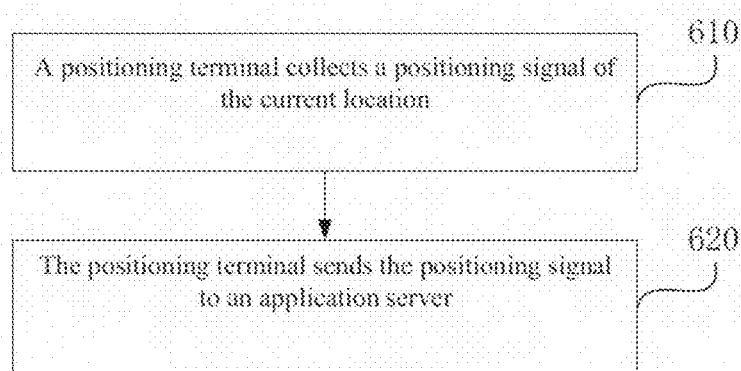
FIG. 6 is a flowchart of a service processing method based on location information according to a sixth embodiment of the present invention.

FIG. 6 is a flowchart of a service processing method based on location information according to the sixth embodiment of the present invention. The method of this embodiment may be executed by a service processing apparatus based on location information. The apparatus may be implemented by hardware and/or software, and may be generally integrated in a positioning terminal having a positioning function and be used cooperatively with an application server. The positioning terminal may specifically be an intelligent terminal, such as a smart phone or a tablet computer having a positioning function, is preferably an electronic chip having a positioning function, or may be a wearable device integrated with the above-mentioned positioning chip, but is not limited to this. The method of this embodiment specifically comprises the operations as follows:

610. A positioning terminal collects a positioning signal of the current location.

In this embodiment, the positioning signal of the current location collected by the positioning terminal may be a direct positioning signal capable of directly determining the location of the positioning terminal, such as a GPS signal, or a WIFI signal, or a base station wireless signal, but is not limited to this.

In this embodiment, the positioning signal of the current location collected by the positioning terminal may also be supplemental positioning signals associated with a direct positioning signal, such as the system time when the positioning terminal acquires the direct positioning signal, or a terminal identification of the positioning terminal sending the direct positioning signal, but is not limited to this.

In a preferred implementation of this embodiment, the positioning terminal collects the positioning signal of the current location according to a custom setting positioning mode or a default setting positioning mode.

In another preferred implementation of this embodiment, the positioning terminal collects the positioning signal of the current location according to a custom setting positioning frequency or default setting positioning frequency.

620. The positioning terminal sends the positioning signal to an application server, so that the application server determines location information about the positioning terminal according to the positioning signal, and exchanges service processing information with an application client according to a service processing rule and based on the location information about the positioning terminal.

In this embodiment, the positioning terminal may send the positioning signal to the application server in real time, or, when a WIFI signal is detected in the surroundings, send the positioning signal to the application server, but is not limited to this.

By means of the technical means of collecting, by a positioning terminal, a positioning signal of the current location; and sending, by the positioning terminal, the positioning signal to an application server, so that the application server determines location information about the positioning terminal according to the positioning signal, and exchanges service processing information with the application client according to a service processing rule and based on the location information about the positioning terminal, the technical solution of this embodiment of the present invention achieves the technical effect of the application server sending adaptive service processing information to the application client and/or the positioning terminal according to different service processing rules, optimizes existing location-based service technology, and meets the growing demand of people for individual and customized location-based services.

On the basis of the above-mentioned embodiments, the method may also comprise: receiving, by the positioning terminal, a positioning mode from the application server to update the type for sending a positioning signal; or receiving, by the positioning terminal, the positioning frequency from the application server to update the positioning frequency; and receiving, by the positioning terminal, the positioning mode and the positioning frequency from the application server to update the type and the positioning frequency for sending a positioning signal.

The Seventh Embodiment

Figure 7:
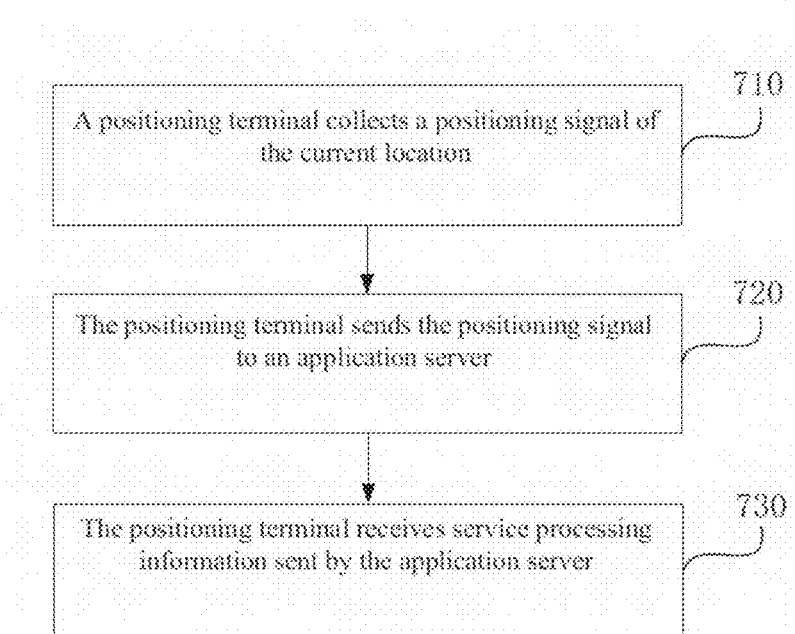
FIG. 7 is a flowchart of a service processing method based on location information according to a seventh embodiment of the present invention.

FIG. 7 is a flowchart of a service processing method based on location information according to the seventh embodiment of the present invention. This embodiment is optimized based on the above-mentioned embodiments, and this embodiment also preferably comprises: the positioning terminal receiving the service processing information sent by the application server.

Accordingly, the method of this embodiment comprises the operations as follows:

710. A positioning terminal collects a positioning signal of the current location.

720. The positioning terminal sends the positioning signal to an application server, so that the application server determines location information about the positioning terminal according to the positioning signal, and exchanges service processing information with an application client according to a service processing rule and based on the location information about the positioning terminal.

730. The positioning terminal receives service processing information sent by the application server.

In this embodiment, the positioning terminal receiving the service processing information sent by the application server may specifically comprise: the positioning terminal receiving a geofencing reminder notification sent by the application server and determined based on the location information about the positioning terminal; or the positioning terminal receiving a notification of distributing an object to be delivered to the positioning terminal sent by the application server, the positioning terminal being a positioning terminal with a matching location searched for by the application server according to the location of the object to be delivered in a delivery distribution request sent by the application client and the location information about at least one positioning terminal.

By means of the technical means of collecting, by a positioning terminal, a positioning signal of the current location; and sending, by the positioning terminal, the positioning signal to an application server, so that the application server determines location information about the positioning terminal according to the positioning signal, and exchanges service processing information with the application client according to a service processing rule and based on the location information about the positioning terminal, the technical solution of this embodiment of the present invention achieves the technical effect of the application server sending adaptive service processing information to the application client and/or the positioning terminal according to different service processing rules, optimizes existing location-based service technology, and meets the growing demand of people for individual and customized location-based services.

The Eighth Embodiment

Figure 8:
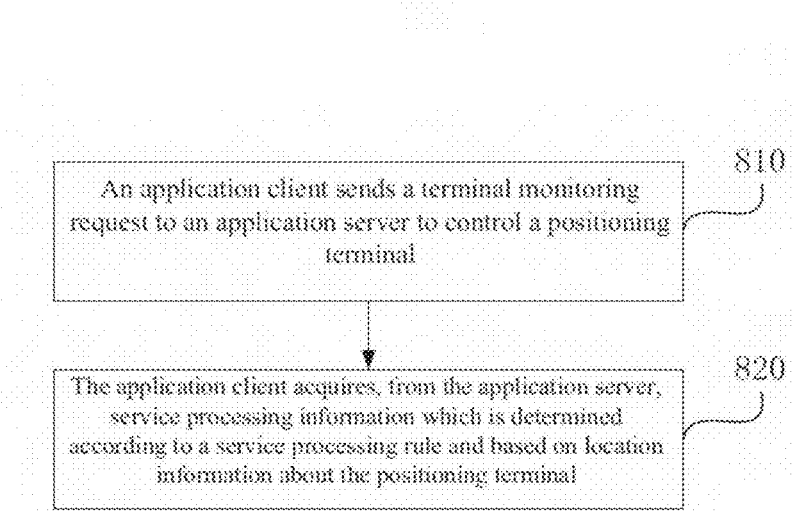
FIG. 8 is a flowchart of a service processing method based on location information according to an eighth embodiment of the present invention.

FIG. 8 is a flowchart of a service processing method based on location information according to the eighth embodiment of the present invention. The method of this embodiment may be executed by a service processing apparatus based on location information. The apparatus may be implemented by hardware and/or software, may be generally integrated in a terminal device for controlling a positioning terminal or acquiring service processing information and be used cooperatively with an application server, and may indirectly control the positioning terminal through the application server. The application client may be a client of a service provider, or a client of a service user, but is not limited to this. The method of this embodiment specifically comprises the operations as follows:

810. An application client sends a terminal monitoring request to an application server to control a positioning terminal.

In this embodiment, the application client sending a terminal monitoring request to an application server to control a positioning terminal may specifically be:

sending, by the application client, a positioning mode to the application server to control the type of positioning signal sent by the positioning terminal through the application server; or sending, by the application client, a positioning frequency to the application server to control the positioning frequency of the positioning terminal through the application server; or sending, by the application client, a positioning mode and a positioning frequency to the application server to control the type and frequency of a positioning signal sent by the positioning terminal through the application server.

In this embodiment, the application client sending a terminal monitoring request to an application server to control a positioning terminal may also specifically be:

sending, by the application client, a geofencing set-up request to the application server to control the application server to send a geofencing reminder notification to a target positioning terminal according to location information about the target positioning terminal determined by the geofencing set-up request.

820. The application client acquires, from the application server, service processing information which is determined according to a service processing rule and based on location information about the positioning terminal.

In this embodiment, the application client acquiring, from the application server, service processing information which is determined according to a service processing rule and based on location information about the positioning terminal may specifically be:

sending, by the application client, a positioning search request to the application server; and receiving, by the application client, a positioning search result returned by the application server, the positioning search result being the location information about a positioning terminal to be sought determined by the application server according to the positioning search request;

may also specifically be: sending, by the application client, a logistics real-time positioning request to the application server; and receiving, by the application client, location information about the logistics positioning terminal returned by the application server and determined by the application server according to the logistics real-time positioning request;

or may also specifically be: sending, by the application client, a delivery distribution request to the application server; and receiving, by the application client a notification of distributing an object to be delivered to the target positioning terminal returned from the application server, the target positioning terminal being a positioning terminal with a matching location searched for by the application server according to the location of the object to-be-delivered in the delivery distribution request and location information about at least one positioning terminal.

By means of the technical means of sending, by an application client, a terminal monitoring request to an application server to control a positioning terminal; and/or acquiring, by the application client service processing information which is determined according to a service processing rule and based on location information about the positioning terminal from the application server, the technical solution of this embodiment of the present invention achieves the technical effect of the application server sending adaptive service processing information to the application client and/or the positioning terminal according to different service processing rules, optimizes existing location-based service technology, and meets the growing demand of people for individual and customized location-based services.

The First Preferred Application Scenario

At present, the main problem in the wearable device industry is: location-dependent wearable devices need a network positioning service; however, the market lacks excellent network positioning service providers to provide technical support for the wearable device industry; furthermore, wearable devices generally need to be used cooperatively with an application program, for example, an application program capable of displaying and searching for a location point or motion track of a wearable device in real time. Different wearable device manufacturers will develop different application programs according to requirements; however, the functions of these application programs generally have a large degree of similarity, so that if each wearable device manufacturer invests resources for the development of software applications, a large waste of resources will be brought about for the whole industry.

In this preferred application scenario, a network positioning service provider (for example, Baidu or Google) with more mature technology may write a perfect positioning service program thereof into an electronic chip for positioning, and may provide universal location information query and management interfaces for manufacturers using wearable devices integrated with the electronic chip, so as to solve the above-mentioned technical problem.

Figure 9:
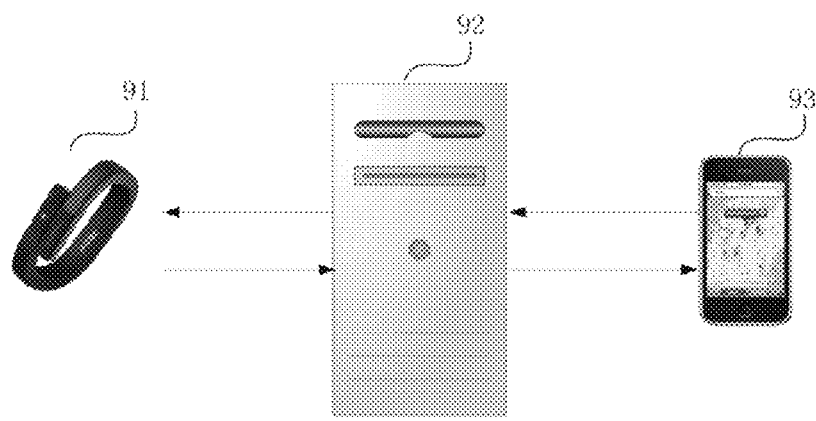
FIG. 9 is a schematic diagram of an application scenario applicable to the embodiments of the present invention.

FIG. 9 shows a specific application scenario of this embodiment of the present invention. As shown in FIG. 9, this preferred application scenario comprises: a wearable device 91, a network positioning server 92 and a smart mobile terminal 93.

The wearable device 91 is the positioning terminal mentioned in various embodiments of the present invention, the network positioning server 92 is the application server mentioned in various embodiments of the present invention, and the smart mobile terminal 93 is the application client mentioned in various embodiments of the present invention.

The wearable device 91 is integrated with a positioning electronic chip, and the positioning electronic chip is provided with a built-in SDK (Software Development Kit) provided by the network positioning service provider of the network positioning server 92. Accordingly, after the wearable device 91 sends the collected positioning signal to the network positioning server 92, the network positioning server 92 may provide a corresponding positioning service for the smart mobile terminal 93.

Preferably, the smart mobile terminal 93 may acquire and store location information (the location point, the location track, the geofencing, etc.) about the wearable device 91 through a search interface provided by the network positioning server 92, and set parameters, such as the positioning mode, positioning frequency and geofencing, of the wearable device 91 through the network positioning server 92.

The Second Preferred Application Scenario

With the continuous rise of online shopping, the logistics industry is also developing continuously. At present, the main service requirement of the logistics industry is: logistics service users or logistics service providers wish to acquire real-time locations of article delivery persons; furthermore, the logistics service providers wish to distribute articles to be delivered to the article delivery persons reasonably according to the delivery places of the articles to be delivered and location information about the article delivery persons.

In this preferred application scenario, a network positioning service provider server or a logistics service provider server acquires the positioning information about the article delivery persons, so as to meet the above-mentioned service requirements of the logistics service users or the logistics service providers.

Figure 10:
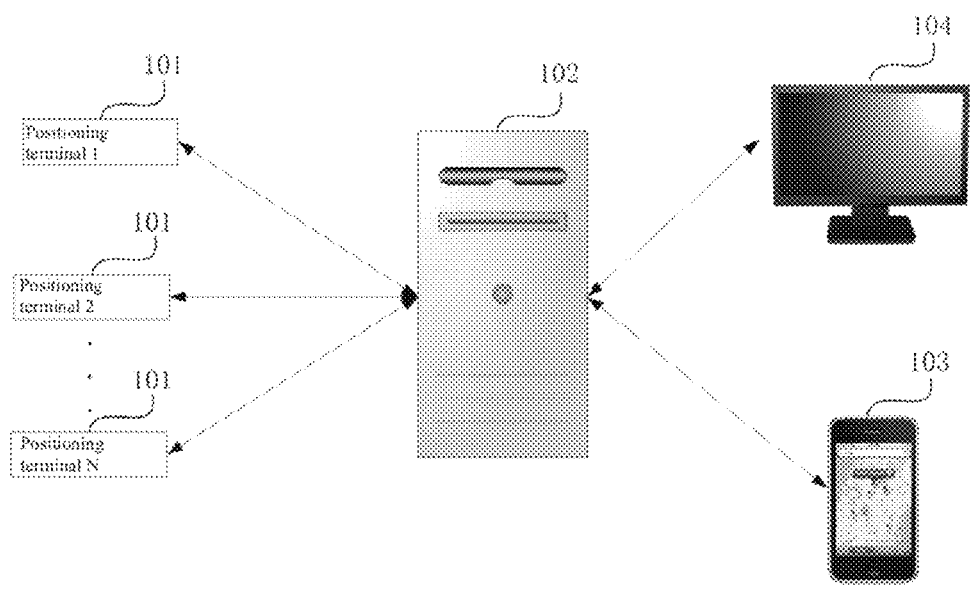
FIG. 10 is a schematic diagram of an application scenario applicable to the embodiments of the present invention.

FIG. 10 shows a specific application scenario of this embodiment of the present invention. As shown in FIG. 10, this preferred application scenario comprises: positioning terminals 101 configured for at least two article delivery persons, an application server 102 for providing a network positioning service function, a client 103 of the logistics service users, and a client 104 of the logistics management persons.

Both the client 103 of the logistics service users and the client 104 of the logistics management persons are application clients mentioned in various embodiments of the present invention.

In this preferred embodiment, the positioning terminals 101 collect positioning signals of the current environment and send same to the application server 102, and the application server 102 acquires and stores location information corresponding to each positioning terminal 101 according to the acquired positioning signals.

If it is desired to acquire the current location point of a specific article delivery person, the logistics service user may send a logistics real-time positioning request to the application server 102 through the client 103, and acquire the location information about the positioning terminal corresponding to the article delivery person returned by the application server 12.

If it is desired to distribute an article to be delivered to the article delivery person, the logistics management person may send a delivery distribution request to the application server 102 through the client 104, and acquire a notification of distributing the object to be delivered to a target positioning terminal returned by the application server.

Accordingly, various embodiments of the present invention may also be adaptively applied to practical application scenarios, such as intelligent traffic management and location monitoring, but are not limited to this.

The Ninth Embodiment

Figure 11:
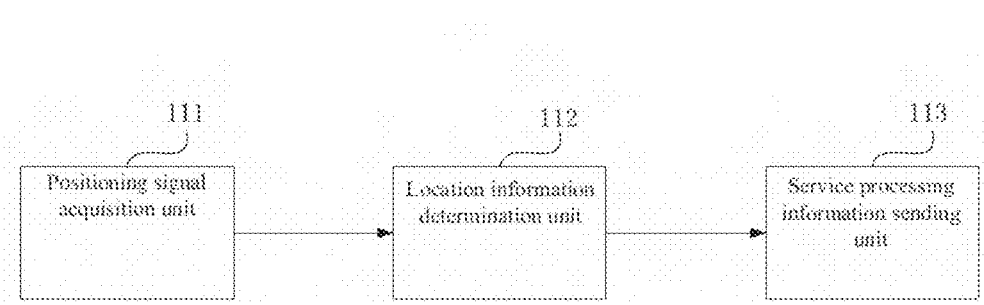
FIG. 11 is a structural diagram of a service processing apparatus based on location information according to a ninth embodiment of the present invention.

FIG. 11 shows a structural diagram of a service processing apparatus based on location information according to a ninth embodiment of the present invention, the apparatus being configured in an application server. As shown in FIG. 11, the apparatus comprises:

a positioning signal acquisition unit 111 for acquiring a positioning signal sent by a positioning terminal;

a location information determination unit 112 for determining location information about the positioning terminal according to the positioning signal; and a service processing information sending unit 113 for sending service processing information to an application client and/or a positioning terminal according to a service processing rule and based on the location information about the positioning terminal.

By means of the technical means of acquiring, by an application server, a positioning signal sent by a positioning terminal; determining, by the application server, location information about the positioning terminal according to the positioning signal; and sending, by the application server, service processing information to an application client and/or a positioning terminal according to a service processing rule and based on the location information about the positioning terminal, the technical solution of this embodiment of the present invention achieves the technical effect of the application server sending adaptive service processing information to the application client and/or the positioning terminal according to different service processing rules, optimizes existing location-based service technology, and meets the growing demand of people for individual and customized location-based services.

On the basis of the above-mentioned embodiments, the location information determination unit may be specifically used for:

determining a location point of the positioning terminal according to the positioning signal; and/or determining a location track of the positioning terminal according to the positioning signals acquired at at least two moments; and/or determining the geofencing of the positioning terminal according to the positioning signal; and/or determining the location point of the positioning terminal and the system time according to the positioning signal.

On the basis of the above-mentioned embodiments, the apparatus may also comprise:

a positioning parameter acquisition unit for acquiring a positioning mode and/or a positioning frequency preset locally or sent by the application client; and a positioning parameter sending unit for sending the positioning mode and/or the positioning frequency to the positioning terminal to control the type and/or frequency of said positioning terminal sending a positioning signal.

On the basis of the above-mentioned embodiments, the service processing information sending unit may be specifically used for:

receiving a positioning search request sent by an application client;

determining a positioning terminal to be sought according to the positioning search request; and sending a positioning search result to the application client based on location information about the positioning terminal to be sought.

On the basis of the above-mentioned embodiments, the service processing information sending unit may be specifically used for:

receiving a geofencing set-up request sent by the application client;

determining a target positioning terminal according to the geofencing set-up request; and sending a geofencing reminder notification to the target positioning terminal according to a service processing rule in the geofencing set-up request and based on location information about the target positioning terminal.

On the basis of the above-mentioned embodiments, the service processing information sending unit may be specifically used for:

acquiring a logistics real-time positioning request sent by the application client;

determining a logistics positioning terminal according to the logistics real-time positioning request; and sending location information about the logistics positioning terminal to the application client in real time based on location information about the logistics positioning terminal.

On the basis of the above-mentioned embodiments, the service processing information sending unit may be specifically used for:

acquiring a delivery distribution request sent by the application client;

searching for a target positioning terminal with a matching location according to the location of an object to be delivered in the delivery distribution request and location information about at least one positioning terminal; and sending, to the target positioning terminal and/or the application client, a notification of distributing the object to be delivered to the target positioning terminal.

The service processing apparatus based on location information provided in this embodiment of the present invention may be used for executing the service processing method based on location information provided in the first to fifth embodiments of the present invention, has corresponding functional modules, and implements the same beneficial effects.

The Tenth Embodiment

Figure 12:
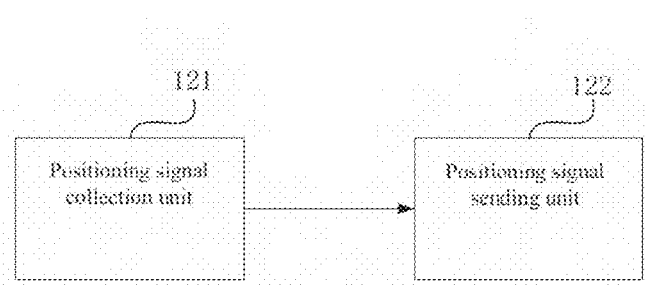
FIG. 12 is a structural diagram of a service processing apparatus based on location information according to a tenth embodiment of the present invention.

FIG. 12 shows a structural diagram of a service processing apparatus based on location information according to the tenth embodiment of the present invention. As shown in FIG. 12, the apparatus comprises:

a positioning signal collection unit 121 for collecting a positioning signal of a current location; and a positioning signal sending unit 122 for sending the positioning signal to an application server, so that the application server determines location information about the positioning terminal according to the positioning signal, and exchanges service processing information with an application client according to a service processing rule and based on the location information about the positioning terminal.

By means of the technical means of collecting, by a positioning terminal, a positioning signal of the current location; and sending, by the positioning terminal, the positioning signal to the application server, so that the application server determines location information about the positioning terminal according to the positioning signal, and exchanges service processing information with the application client according to a service processing rule and based on the location information about the positioning terminal, the technical solution of this embodiment of the present invention achieves the technical effect of the application server sending adaptive service processing information to the application client and/or the positioning terminal according to different service processing rules, optimizes existing location-based service technology, and meets the growing demand of people for individual and customized location-based services.

On the basis of the above-mentioned embodiments, the positioning signal may be at least one of the following: a GPS signal, a WIFI signal, and a base station wireless signal.

On the basis of the above-mentioned embodiments, the apparatus may also comprise:

a positioning parameter receiving unit for receiving a positioning mode and/or a positioning frequency from the application server to update the type and/or frequency of sending a positioning signal.

On the basis of the above-mentioned embodiments, the apparatus may also comprise:

a service processing information receiving unit for receiving service processing information sent by the application server.

On the basis of the above-mentioned embodiments, the positioning terminal may be an electronic chip integrated in a wearable device.

The service processing apparatus based on location information provided in this embodiment of the present invention may be used for executing the service processing method based on location information provided in the sixth and seventh embodiments of the present invention, has corresponding functional modules, and implements the same beneficial effects.

The Eleventh Embodiment

Figure 13:
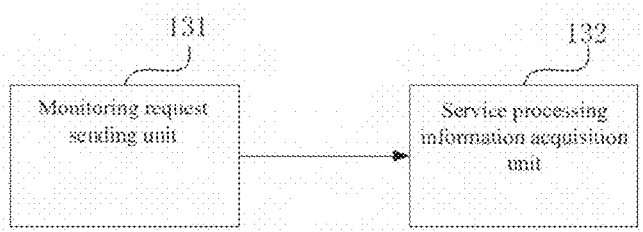
FIG. 13 is a structural diagram of a service processing apparatus based on location information according to an eleventh embodiment of the present invention.

FIG. 13 shows a structural diagram of a service processing apparatus based on location information according to the eleventh embodiment of the present invention. As shown in FIG. 13, the apparatus comprises:

a monitoring request sending unit 131 for sending a terminal monitoring request to an application server to control a positioning terminal; and a service processing information acquisition unit 132 for acquiring, from the application server, service processing information which is determined according to a service processing rule and based on location information about the positioning terminal.

By means of the technical means of sending, by an application client, a terminal monitoring request to an application server to control a positioning terminal; and/or acquiring, by the application client, service processing information which is determined according to a service processing rule and based on location information about the positioning terminal from the application server, the technical solution of this embodiment of the present invention achieves the technical effect of the application server sending adaptive service processing information to the application client and/or the positioning terminal according to different service processing rules, optimizes existing location-based service technology, and meets the growing demand of people for individual and customized location-based services.

On the basis of the above-mentioned embodiments, the service processing information acquisition unit may specifically be used for:

sending a positioning search request to the application server; and receiving a positioning search result returned by the application server, the positioning search result being location information about a positioning terminal to be sought determined by the application server according to the positioning search request.

On the basis of the above-mentioned embodiments, the service processing information acquisition unit is specifically used for:

sending a logistics real-time positioning request to the application server; and receiving location information about the logistics positioning terminal returned by the application server and determined by the application server according to the logistics real-time positioning request.

On the basis of the above-mentioned embodiments, the service processing information acquisition unit is specifically used for:

sending a delivery distribution request to the application server; and receiving a notification of distributing an object to be delivered to the target positioning terminal returned by the application server, the target positioning terminal being a positioning terminal with a matching location searched for by the application server according to the location of the object to be delivered in the delivery distribution request and location information about at least one positioning terminal.

The service processing apparatus based on location information provided in this embodiment of the present invention may be used for executing the service processing method based on location information provided in the eighth embodiment of the present invention, has corresponding functional modules, and implements the same beneficial effects.

Obviously, those of skill in the art should understand that various modules or various steps above of the present invention may be implemented by the cooperation of the positioning terminal, application server and application client mentioned above. Optionally, the embodiments of the present invention may be implemented by means of computer apparatus executable programs, thereby being able to store same in a storage apparatus to be executed by a processor. The programs may be stored in a computer readable storage medium. The storage medium mentioned above may be a read-only memory, a magnetic disk or an optical disc, etc.; or they are made into various integrated circuit modules respectively, or a plurality of modules or steps thereof are made into a single integrated circuit module. In this way, the present invention is not limited to any particular combination of hardware and software.

The foregoing are only preferred embodiments of the present invention and are not intended to limit the present invention, and for those of skill in the art, the present invention can have a variety of changes and variations. Any modification, equivalent replacement, or improvement, etc. made within the spirit and principle of the present invention shall all fall within the scope of protection of the present invention.

What is claimed is:

1. A service processing method based on location information, comprising:
   acquiring a positioning signal sent by a positioning terminal;
   determining location information about the positioning terminal according to said positioning signal; and
   sending service processing information to at least one of an application client and the positioning terminal according to a service processing rule and based on the location information about the positioning terminal,
   wherein said acquiring, said determining, and said sending are performed by an application server, and
   wherein the positioning terminal sends a geofencing set-up request to the application server for defining a geofencing boundary configured by four boundary points, and
   wherein said determining the location information comprises determining whether the positioning terminal leaves the defined geofencing boundary.

2. The method of claim 1, further comprising:
   acquiring at least one of a positioning mode and a positioning frequency that is at least one of preset locally and sent by the application client; and
   sending at least one of the positioning mode and the positioning frequency to the positioning terminal to control at least one of a type and frequency of the positioning terminal sending the positioning signal.

3. The method of claim 1, said sending the service processing information comprises:
   receiving a positioning search request sent by the application client;
   determining a selected positioning terminal to be sought according to the positioning search request; and
   sending a positioning search result to the application client based on location information about the selected positioning terminal.

4. The method of claim 1, wherein said sending the service processing information comprises:
   receiving a geofencing set-up request sent by the application client;
   determining a target positioning terminal according to the geofencing set-up request; and
   sending a geofencing reminder notification to the target positioning terminal according to a service processing rule in the geofencing set-up request and based on the location information about the target positioning terminal.

5. The method of claim 1, wherein said sending the service processing information comprises:
   acquiring a logistics real-time positioning request sent by the application client;
   determining a logistics positioning terminal according to the logistics real-time positioning request; and
   sending location information about the logistics positioning terminal to the application client in real time based on the location information about the logistics positioning terminal.

6. The method of claim 1, wherein said sending the service processing information comprises:
   acquiring a delivery distribution request sent by the application client;
   searching for a target positioning terminal with a matching location according to the location of an object to be delivered in the delivery distribution request and location information about at least one positioning terminal; and
   sending a notification of distributing the object to be delivered to the target positioning terminal to at least one of the target positioning terminal and the application client.

7. The method of claim 1, wherein said determining the location information includes:
   determining a location point of the positioning terminal according to the positioning signal;
   determining a location track of the positioning terminal according to the positioning signals acquired at least two moments;
   determining a geofencing of the positioning terminal according to the positioning signal;
   determining the location point of the positioning terminal and the system time according to the positioning signal; or
   a combination thereof.

8. A service processing apparatus disposed within a positioning terminal, comprising:
   a positioning signal collection unit for collecting a positioning signal of a current location; and
   a positioning signal sending unit for sending the positioning signal to an application server so that the application server determines location information about the positioning terminal according to the positioning signal and exchanges service processing information with an application client according to a service processing rule and based on the location information about the positioning terminal,
   wherein the positioning terminal sends a geofencing set-up request to the application server for defining a geofencing boundary configured by four boundary points, and
   wherein said determining the location information comprises determining whether the positioning terminal leaves the defined geofencing boundary.

9. The apparatus of claim 8, wherein the positioning signal is at least one of a GPS signal, a WIFI signal and a base station wireless signal.

10. The apparatus of claim 8, further comprising a positioning parameter receiving unit disposed in the positioning terminal for receiving at least one of a positioning mode and a positioning frequency from the application server to update at least one of a type of the positioning signal and a frequency of sending the positioning signal.

11. The apparatus of claim 8, further comprising a service processing information receiving unit disposed in the positioning terminal for receiving service processing information sent by the application server.

12. The apparatus of claim 11, wherein said positioning parameter receiving unit receives a geofencing reminder notification sent by the application server and determined based on the location information about the positioning terminal.

13. The apparatus of claim 11, wherein said positioning parameter receiving unit receives a notification of distributing an object to be sent by the application server and delivered to the positioning terminal, the positioning terminal being associated with a matching location searched for by the application server according to the location of the object to be delivered in a delivery distribution request sent by the application client and location information about at least one positioning terminal.

14. The apparatus of claim 8, wherein the positioning terminal comprises an electronic chip integrated in a wearable device.

15. A service processing apparatus associated with an application client, comprising:
   a monitoring request sending unit for sending a terminal monitoring request to an application server to control a positioning terminal; and
   a service processing information acquisition unit for acquiring service processing information from the application server, the service processing information being determined according to a service processing rule and based on location information about the positioning terminal,
   wherein the positioning terminal is configured to send a geofencing set-up request to the application server for defining a geofencing boundary configured by four boundary points, and
   wherein the application server is configured to determine whether the positioning terminal leaves a defined geofencing boundary configured by four boundary points and to send a corresponding geofencing reminder notification to the positioning terminal based upon the determination.

16. The apparatus of claim 15, wherein said monitoring request sending unit is configured for sending at least one of a positioning mode and a positioning frequency to the application server to control at least one of a type and frequency of the positioning terminal sending a positioning signal through the application server.

17. The apparatus of claim 15, wherein said monitoring request sending unit is configured for sending a geofencing set-up request to the application server to control the application server to send a geofencing reminder notification to a target positioning terminal according to location information about the target positioning terminal determined by the geofencing set-up request.

18. The apparatus of claim 15, wherein said service processing information acquisition unit is configured for:
   sending a positioning search request to the application server; and
   receiving a positioning search result returned by the application server, the positioning search result being location information about the positioning terminal to be sought determined by the application server according to the positioning search request.

19. The apparatus of claim 15, wherein said service processing information acquisition unit is configured for:
   sending a logistics real-time positioning request to the application server; and
   receiving location information about a logistics positioning terminal returned by the application server and determined by the application server according to the logistics real-time positioning request.

20. The apparatus of claim 15, wherein said service processing information acquisition unit is configured for:
   sending a delivery distribution request to the application server; and
   receiving a notification of distributing an object to be delivered to the target positioning terminal returned by the application server, the target positioning terminal being a positioning terminal with a matching location searched for by the application server according to the location of the object to be delivered in the delivery distribution request and location information about at least one positioning terminal.

* * * * *